United States Patent
Eisele et al.

(10) Patent No.: US 6,889,607 B2
(45) Date of Patent: May 10, 2005

(54) METHOD FOR DRAWING A PRINTING MASTER ONTO A PRINTING FORM CYLINDER

(75) Inventors: Peter Eisele, Östringen (DE); Gerhard Schlindwein, Graben-Neudorf (DE); Andreas Schorpp, Au Am Rhein (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/679,182

(22) Filed: Oct. 2, 2003

(65) Prior Publication Data

US 2004/0089182 A1 May 13, 2004

(30) Foreign Application Priority Data

Oct. 2, 2002 (DE) .......................................... 102 46 238
Dec. 17, 2002 (DE) .......................................... 102 58 854

(51) Int. Cl.⁷ ............................................... B41F 13/10
(52) U.S. Cl. ................................ 101/415.1; 101/401.1; 101/378; 101/418; 101/477; 430/230
(58) Field of Search ............................. 101/401.1, 477, 101/415.1, 418, 382.1, 378; 430/204

(56) References Cited

U.S. PATENT DOCUMENTS

| 5,355,795 A | 10/1994 | Moss et al. |
| 5,727,749 A | 3/1998 | Pensavecchia et al. |
| 6,026,747 A * | 2/2000 | Carme et al. ............ 101/415.1 |
| 2002/0033107 A1 | 3/2002 | Schmid |
| 2003/0196564 A1 | 10/2003 | Sejima et al. |

FOREIGN PATENT DOCUMENTS

| CA | 2065020 | 8/1990 |
| CA | 2065363 | 8/1990 |
| DE | 692 03 148 T3 | 11/1992 |
| DE | 694 02 638 T2 | 3/1995 |
| EP | 0 487 565 B1 | 6/1992 |
| EP | 0 512 549 B2 | 11/1992 |
| EP | 0 640 478 B1 | 3/1995 |
| WO | 91/03120 | 3/1991 |

* cited by examiner

Primary Examiner—Andrew H. Hirshfeld
Assistant Examiner—Kevin D. Williams
(74) Attorney, Agent, or Firm—Laurence A. Greenberg; Werner H. Stemer; Ralph E. Locher

(57) ABSTRACT

A method for mounting a printing master on a printing form cylinder includes readying a new print job with a printing-image length by releasing an unwinding spool, activating an unwinding spool drive for moving the printing master a length in circumferential direction of the cylinder on the circumferential surface by drawing the printing master to a rewinding spool and braking the unwinding spool for building tension. A preceding job image start is located on the surface facing the rewinding spool. A control device activates the unwinding spool drive and, before activation, data is produced in the control device regarding the length to be spooled forward, and the spools are fixed, after advancing the printing master a length, for insuring tension. A value is determined for the printing master length to be spooled forward, being at most the printing image length of the preceding print job plus a printing image spacing.

6 Claims, 10 Drawing Sheets

METHOD FOR DRAWING A PRINTING MASTER ONTO A PRINTING FORM CYLINDER

BACKGROUND OF THE INVENTION

Field of the Invention

The invention relates to a method for drawing a printing master in the form of a foil or film onto a printing form cylinder, which includes, for making ready a new print job with a given printing-image length, releasing an unwinding spool, and activating a drive for the unwinding spool for moving the printing master a prescribed length in circumferential direction of the printing form cylinder on the circumferential surface of the cylinder by drawing the printing master from a rewinding spool. The unwinding spool is braked in order to build up tension in the printing master, and the image start of a preceding print job is located on the circumferential surface facing the rewinding spool. A control device is provided for activating the drive for the unwinding spool and, before activating the drive for the unwinding spool, data is produced for the control device regarding the length to be spooled forward. The rewinding spool and the unwinding spool are fixed, after the printing master has been advanced the prescribed length, for insuring tension in the printing master.

German Translation DE 692 03 148 T3 of Amended European Patent EP 0 512 549 B2 describes a rotary offset printing press with a single printing form cylinder, wherein the plate cylinder bears printing forms of n colors, which are disposed at predetermined spacings in the circumferential direction. The printing form cylinder has at least one device associated therewith for producing the printing forms. It is possible with that device to produce an image on the printing form blanks, preferably using a laser imaging or image-setting unit. The printing forms are located on a printing film or master which, starting from an unwinding spool disposed in the printing form cylinder, is disposed around the circumferential surface of the printing form cylinder. The other end of the printing film is fastened to a rewinding spool, which is likewise located in the interior of the printing form cylinder. After a print job has been completed, the used or spent printing film is wound onto the rewinding spool, while new printing film is moved from the unwinding spool onto the circumferential surface of the printing form cylinder.

German Translation DE 694 02 638 T2 of European Patent EP 0 640 478 B1, which corresponds to U.S. Pat. No. 5,355,795, describes a device with which printing film can be drawn onto a printing form cylinder. The printing film is stored on an unwinding spool which, together with a rewinding spool, is accommodated in the form of a cassette in the interior of the printing form cylinder. The printing film is guided out of the printing form cylinder, starting from the unwinding spool, through a slot extending in the direction of a generatrix or surface line, is disposed around the circumferential surface of the printing form cylinder, and extends back to the rewinding spool through a further slot. The rewinding spool is coupled with a drive for spooling the printing film forward after a print job has been completed. In order to ensure that the printing film lies smoothly on the circumferential surface of the printing form cylinder after it has been spooled forward, the printing film is subjected to tension or tautened during the forward-spooling operation. For that purpose, the rewinding and unwinding spools may be locked independently of one another. The unwinding spool is locked by a toothed directional locking mechanism, the pawl of which is disengaged by an actuator during the forward-spooling operation. The amount of printing form material which is released by the unwinding spool during a forward-spooling cycle is determined from the holding time of a relay with which the actuator is activated.

In the advancements produced in the prior art, it is always the case that at least as much printing film is spooled forward, independently of the printing image length, as has been inked with printing ink during the preceding print job. That corresponds to the area of the circumferential surface of a printing form cylinder, which is in rolling contact with the ink applicator rollers and with an adjacent transfer cylinder of an offset printing press. Consequently, a printing film which has been inked once and is in rolling contact with ink applicator rollers or transfer cylinders is deemed to have been used in those advanced methods of the prior art, and is replaced in every case. Printing film is an expensive consumable item. It is a disadvantage that, during the printing of images with a small format length, it is always the case that sections of the lengths of the printing film which have not had images set thereon are also considered to have been used due to the contact with the ink applicator rollers and the transfer cylinder, and are spooled forward. The available printing film is therefore not fully utilized, and consequently the number of print jobs that are possible is reduced.

U.S. Pat. No. 5,727,749 describes a device for spooling printing film forward on a cylinder. The time period for activating the spooling device is determined based upon the radius and the thickness of the printing film on an unwinding spool or rewinding spool. In every case, so much printing form material is spooled forward for producing the printing image for a current print job, that additional printing film material has being spooled forward in order to avoid overlapping with the previous printing image, thereby leaving a gap between the printing images. In order to avoid the advancement of more material than necessary, the advanced length may be continuously sensed or monitored by a detector. In that improvement, it is assumed that the length of the printing image corresponds at least approximately to the length of the circumferential surface of a printing form cylinder which is in rolling contact with ink applicator rollers and a transfer cylinder during printing. In order to ensure the provision of the gap between the printing images, a fixed amount of the printing film, which reliably prevents overlapping, is predetermined.

European Patent Application EP 487 565 A1, corresponding to Canadian Patent Nos. 2,065,363 and 2,065,020, describes a device for automatically clamping and unclamping recording material, wherein roll film material is released from a roll film cassette in accordance with a predetermined format, cut to length and clamped by vacuum on a recording drum. The sheets of film of separated colors belonging to one printing image have a uniform format length as seen in the circumferential direction of the recording drum. The uniform format length thus results from the printing image length plus two edge spacings. That includes any printing control elements, such as printing control strips, which may be present in the printing image.

SUMMARY OF THE INVENTION

It is accordingly an object of the invention to provide a method for drawing or pulling printing film onto a printing form cylinder, which overcomes the hereinafore-mentioned disadvantages of the heretofore-known methods of this general type and which affords an improved use of material.

With the foregoing and other objects in view, there is provided, in accordance with the invention, a method for drawing a printing master in the form of a foil or film on a printing form cylinder. The method comprises, for making ready a new print job with a given printing-image length, releasing an unwinding spool and activating a drive for the unwinding spool for moving the printing master a prescribed length in circumferential direction of the printing form cylinder on the circumferential surface of the cylinder by drawing the printing master from a rewinding spool. The unwinding spool is braked for building up tension in the printing master. The image start of a preceding print job is located on the circumferential surface facing the rewinding spool. A control device is provided for activating the drive for the unwinding spool. Before activating the drive for the unwinding spool, data is produced for the control device regarding the length to be spooled forward. The rewinding spool and the unwinding spool are fixed, after the printing master has been advanced the prescribed length, for insuring tension in the printing master. A value of the length of the printing master to be spooled forward is provided, which is at most equal to the length of the printing image of the immediately preceding print job plus a printing image spacing.

In accordance with another mode of the invention, the method further includes determining the printing image spacing by applying at least one of the following variables: a correction value for mechanical slip and for tolerances in the drive of the rewinding spool, a residual material length of the printing master, a safety spacing, and a correction value for the spacing of teeth of a toothed directional locking mechanism connected to the unwinding spool for fixing the unwinding spool after the printing master has been advanced.

In accordance with a further mode of the invention, the method further includes basing the safety spacing on empirically determined statistical values.

In accordance with an added mode of the invention, the method further includes determining the possible remaining print jobs from the residual material length.

In accordance with an additional mode of the invention, the method further includes calculating in a preceding print job, wherein partial images are present in the form of digital data, the length of the printing master to be spooled forward, by determining, for a partial image, the spacing of a screening pixel lying farthest away from the image start in the circumferential direction of the printing form cylinder.

In accordance with yet another mode of the invention, the method further includes determining the spacing during imaging of the printing master for the preceding print job by counting and buffer-storing, column by column, cycles required in the circumferential direction when producing screening pixels on the printing film. A maximum value of the cycle numbers, buffer-stored column by column, across all of the columns of color separation, is determined and that maximum value is applied when calculating the length to be spooled forward.

In accordance with a concomitant mode of the invention, the method further includes determining the spacing by simulating imaging of the printing master for the preceding print job.

The invention is thus based on the fact that always only as much material length is spooled forward, including a minimum printing image spacing, as has had images set thereon in the circumferential direction in the preceding print job. After the forward-spooling operation, the image start which is to be set is located in the vicinity of a channel edge of the printing form cylinder which forms the leading edge during printing and via which the printing film leads into the interior of the printing form cylinder to the rewinding spool. Depending upon the printing image length, the image end lies more or less in front of the trailing channel edge, via which the printing film is guided out of the interior from the unwinding spool. During printing, the area of the printing film between the image end and the trailing channel edge comes into contact with ink applicator rollers and an adjacent transfer cylinder. Any ink residues which may be present in this area as a result of printing are removed with the aid of a cleaning device prior to imaging or image setting.

Due to the fact that only as much printing film is spooled forward as has been used during imaging, it is possible to process more print jobs for the available length of the printing film, in particular when print jobs with a relatively small image length are printed, with cost savings as the result. In the case of an offset printing press having a plurality of printing units, the cost saving is produced for every printing unit.

The length of the material of the printing film to be subjected to imaging can be buffer-stored in order to calculate the advance length, and continuously updated. It is possible to increase the accuracy of the calculation of the length of printing film to be spooled forward if mechanical inaccuracies, such as slip and tolerances in the mechanism elements of an advancing device, are compensated for. When calculating the length of printing film to be spooled forward, it is possible to take into account a safety spacing between printing images, in the case of which safety spacing deviations caused by machinery are included in the calculations in the form of a safety characteristic curve. In forward-spooling devices wherein the unwinding spool is fixed by using a toothed directional locking mechanism, it is possible to take into account the tooth pitch of a ratchet wheel during the calculation of the length to be spooled forward. It is possible to perform a more accurate calculation of the imaging operations which remain possible by using the actual residual length of the printing film.

A further saving of printing film results in the case of printing images wherein a separate color or a color separation is present only in a partial area in the circumferential direction of the printing form cylinders. This can be achieved by a different mode of the method, wherein the lengths of the color separations or separate colors which have actually been subjected to imaging in the circumferential direction are determined separately. For this purpose, it is possible, for each color separation, to determine the screening pixel lying farthest away from the image start.

In printing presses which have an integrated device for producing a printing form, a program can be executed on a computer in the control device for setting images on the printing films in the manner of a grid, with which program the image data are analyzed to form the color separations and, as a result, the effective length of printing film to be spooled forward is determined. This analysis and calculation can take place during the imaging operation of the printing films of a preceding print job.

The program for determining the lengths of printing films to be spooled forward can be integrated into a program for subjecting the printing film to imaging or image setting, wherein output signals from a counter are used. The counter can be activated by the clock serving for activating imaging radiation sources, such as laser diodes. In the case of every pixel set onto a printing film, the current counter state is buffer-stored for each column of pixels lying in the circumferential direction of a printing form cylinder. As a result, the counter always contains the position of the last set point of a column of pixels. The program for determining the lengths of printing films to be spooled forward balances or equalizes the counter readings of the pixel columns and determines the length to be spooled forward for every color separation by taking over the maximum values. It is possible to convert the maximum values of the pixels into any desired data format related to a unit of length.

Furthermore, the analysis program can only simulate an imaging operation, the pixel at the greatest spacing from the imaging start being determined for each color separation. There is taken into consideration, in this regard, that a further print job may have been set into an existing printing image as a double or multiple copy, and that a color control strip may be present next to a useful image.

Other features which are considered as characteristic for the invention are set forth in the appended claims.

Although the invention is illustrated and described herein as embodied in a method for drawing a printing master onto a printing form cylinder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
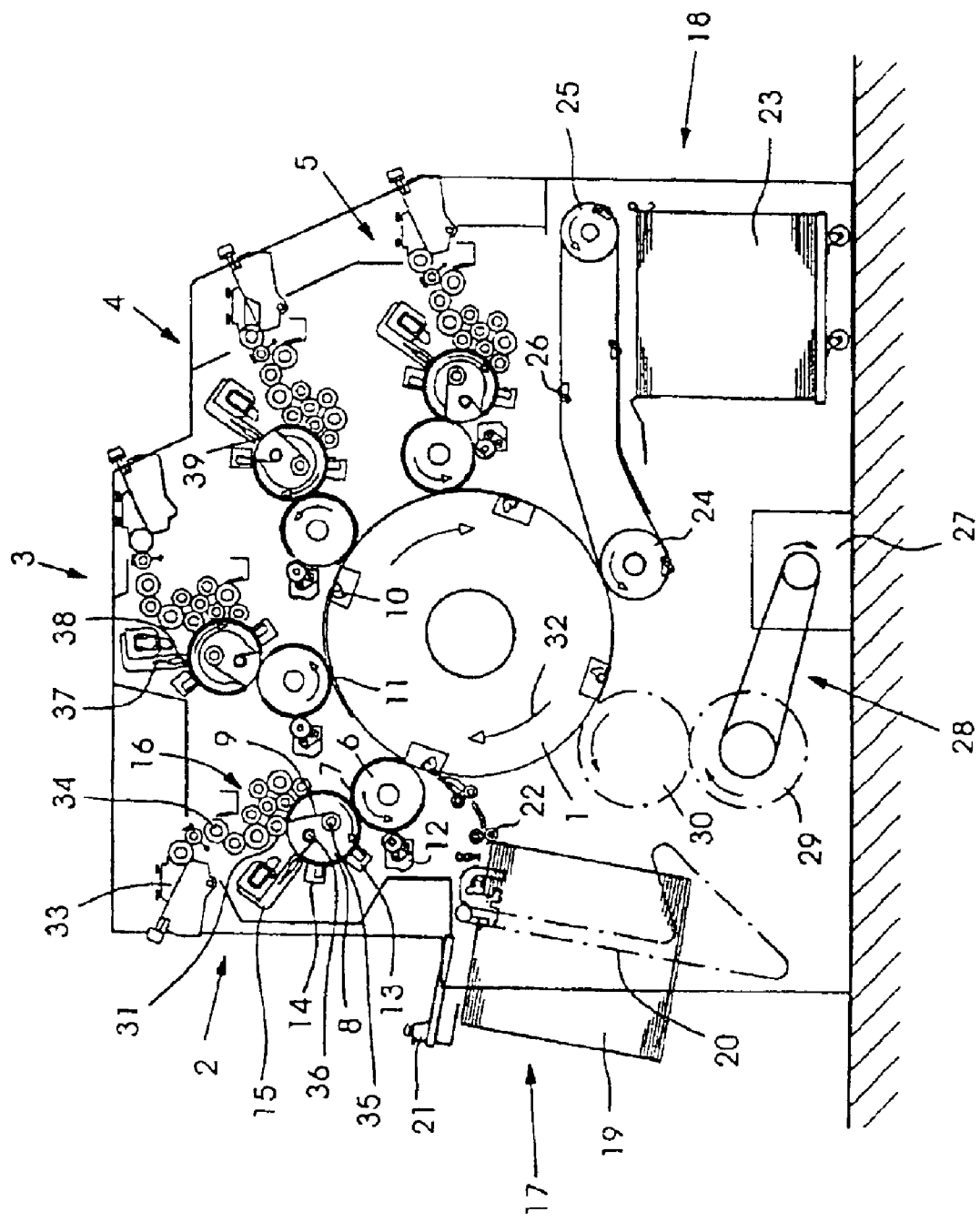
FIG. 1 is a diagrammatic, side-elevational view of a sheet-fed offset printing press having integrated devices for printing form production in accordance with the method of the invention.

Referring now to the figures of the drawings in detail and first, particularly, to FIG. 1 thereof, there is seen a diagrammatic view of a sheet-fed offset printing press having a satellite construction. Four printing units 2 to 5 are disposed around an impression cylinder 1. Each printing unit 2 to 5 includes a transfer cylinder 6 with an elastic covering 7 and a printing form cylinder 8 with a printing master or film 9 drawn thereon. The diameters of the transfer cylinders 6 and of the printing form cylinders 8 are identical. The diameter of the impression cylinder 1 is four times that of a printing form cylinder 8. Four rows of grippers 10, which hold sheets 11 on the circumferential surface of the impression cylinder 1 during printing, are disposed on the impression cylinder 1. The transfer cylinders 6 and the printing form cylinders 8 have respective cleaning devices 12, 13 assigned to each thereof. Furthermore, the printing form cylinders 8 have extraction or suction removal devices 14, imaging or image-setting devices 15 and inking units 16 assigned thereto. The sheet-fed offset printing press has a feeder 17 and a delivery 18. The feeder 17 includes a stack or pile 19 for sheets 11, a lifting device 20 for the stack 19, a separating or singling device 21 on the upper side of the stack 19, and a feeding device 22 for feeding separated sheets 11 individually from the stack 19 to the impression cylinder 1. The delivery 18 includes a stack or pile 23 for printed sheets 11 and a chain gripper system 26, which is guided over deflection rollers 24 and 25, for transporting the sheets 11 from the impression cylinder 1 to the stack 23. In order to drive the sheet-fed offset printing press, a motor 27 is provided which is connected to a belt drive 28 and a gearwheel mechanism or transmission formed by gearwheels 29 and 30 for driving the impression cylinder 1. The impression cylinder 1, the transfer cylinders 6, the printing form cylinders 8, the ink applicator rollers 31 of the inking units 16, the feeder 17 and the delivery 18 are coupled with one another via a common gear train.

During printing, the sheets 11 are continuously removed from the stack 19 by the separating or singling device 21 and delivered into the grippers of the rows of grippers 10 by the feed device 22. The lifting device 20 ensures that the sheets 11 in the stack 19 are continuously fed to the separating or singling device 21. The transfer cylinders 6 are brought into contact with the impression cylinder 1 and the printing form cylinders 8. The ink applicator rollers 31 are likewise moved into contact with the printing form cylinders 8. All of the cylinders 1, 6 and 8 and the ink applicator rollers 31 are driven in the directions represented by arrows 32 by the motor 27, the belt drive 28 and the gearwheels 29 and 30. During the rotation of the impression cylinder 1, printing ink is transferred, starting from ink fountains or ducts 33, via ink transfer rollers 34 and the ink applicator rollers 31, onto the surface of the printing films or masters 9. Prior to the printing, the printing film or master 9 has been subjected to imaging or image setting, so that image pixels or halftone dots for receiving printing ink are disposed in a manner corresponding to a printing image on the printing master 9. Furthermore, the printing ink is transferred from the printing form cylinders 8 via the transfer cylinders 7 to the sheets 11 which, while held in the rows of grippers 10, are conveyed on the surface of the impression cylinder 1. One separated color is printed onto the sheets 11 by each printing unit 2 to 5. After one rotation of the impression cylinder 1, four colors have been printed over one another on the sheets 11 to form a printed image. The completely printed sheets 11 are conveyed onto the stack 23 by the chain gripper system 26.

After printing, the feeding of the sheets 11 by the feeder 17 is stopped, the transfer cylinders 6 are thrown off the impression cylinder 1 and the printing form cylinders 8, and the ink applicator rollers 31 are thrown off the printing form cylinders 8. The transfer cylinders 6 and the printing form cylinders 8 are cleaned with the aid of the cleaning devices 12 and 13.

In order to make ready for the next print job, a calculated amount of the printing masters or films 9 are spooled forward on the printing form cylinders 8. The printing masters or films 9 are respectively stored in the interior of a respective printing form cylinder 8 on unwinding spools 35. The unwinding spools 35 are released, and rewinding spools 36 for taking up the used or spent printing master or film 9 are motor-driven, for the forward-spooling operation. The lengths that are spooled forward correspond to the length of the variable printing image length of the immediately preceding print job plus a printing image spacing. After new printing masters or films 9 have been drawn onto the printing form cylinders 8, the latter are set in rotation and the imaging or image-setting devices 15 are activated. Each imaging device 15 includes a laser diode array 37 and optically projecting elements 38. In order to be able to sense the entire surface of the printing film or master 9, the imaging devices 15 are respectively positioned in a direction parallel to the rotational axes of the printing form cylinders 8. When a laser of the laser diode array 37 is activated, the laser beams 39 are focused onto the material of the printing master or film 9. Heat is generated, which detaches a part of a layer of the printing master or film 9 in accordance with the image. Particles of the pixels or halftone dots which lie loose on the surface of the printing master or film 9 when detached are removed with the aid of the extraction or suction removal devices 14.

Reference characters previously introduced with respect to elements in the description of FIG. 1 are hereinafter applied to elements having an equivalent function.

Figure 2:
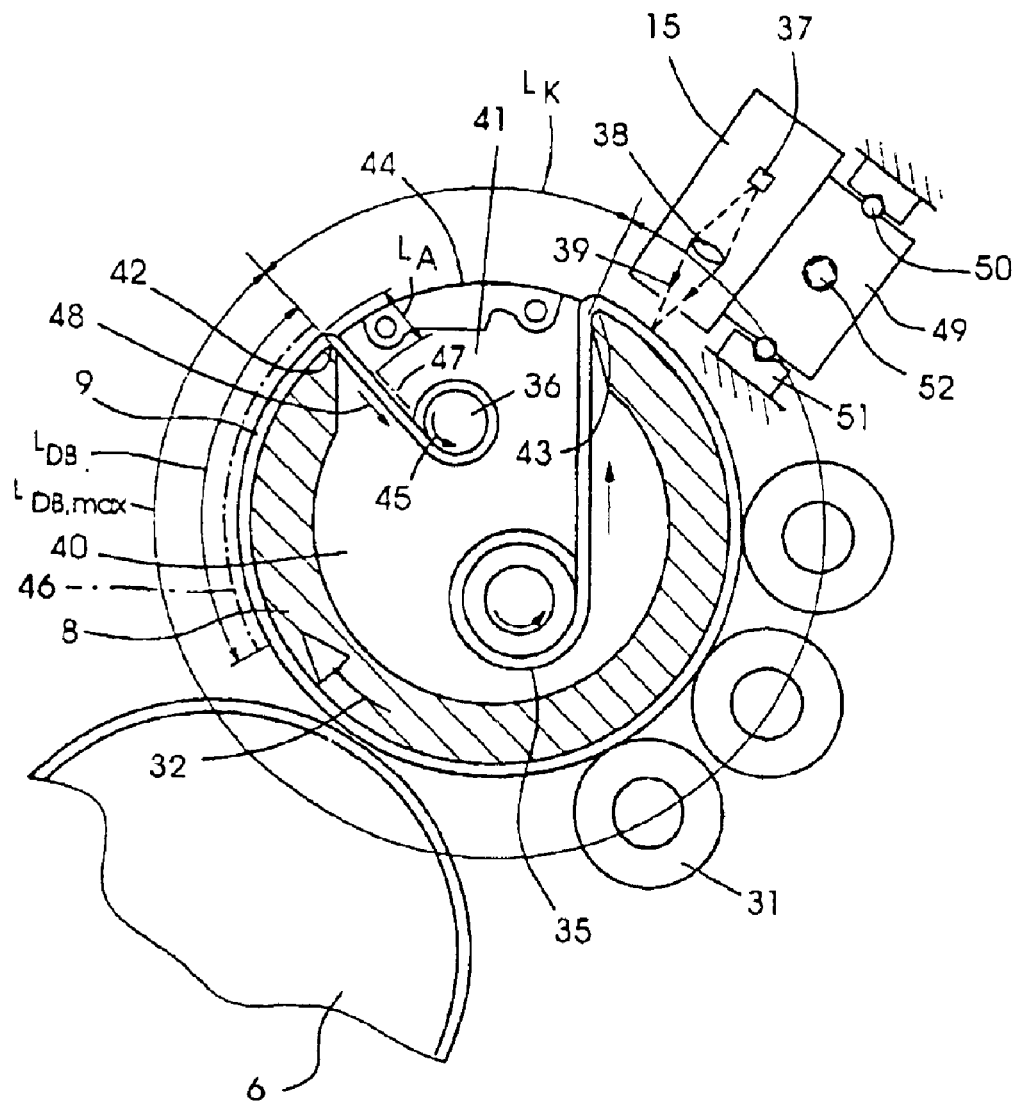
FIG. 2 is an enlarged, fragmentary sectional view of FIG. 1, showing a printing form cylinder of the sheet-fed offset printing press.

As shown in FIG. 2, every printing form cylinder 8 is formed with a cavity 40, wherein the unwinding spool 35 and the rewinding spool 36 are rotatably disposed. The cavity 40 is accessible via a channel 41 having a leading channel edge 42 and a trailing channel edge 43, the channel 41 being closable by a cover 44. The printing master or film 9 is guided from the unwinding spool 35 through a slot formed between the cover 44 and the trailing channel edge 43, wraps around the circumferential surface of the printing form cylinder 8 and is guided to the rewinding spool 36 through a further slot formed between the cover 44 and the leading channel edge 42. During the forward-spooling operation, the rewinding spool 36 is driven in the direction of the arrow 45, while the unwinding spool 35 is braked somewhat. After the imaging operation, the printing master 9 bears a printing image 46 for an upcoming print job. The imaging operation starts at the print start in the vicinity of the channel edge 42. The length $L_{DB}$ of the printing image is less than the maximum possible length $L_{DBmax}$. Furthermore, the printing form 9 bears a printing image 47 from the preceding print job. After the printing form 9 has been spooled forward, the printing image 47 is situated behind the channel edge 42. In the forward-spooling direction 48, there is a spacing $L_A$ between the preceding printing image 47 and the current printing image 46. The channel region $L_K$ of the printing form cylinder 8 is not available during printing. The cover 44 is reduced in height in the channel region $L_K$.

Furthermore, FIG. 2 shows a possible way of positioning the imaging device 15 laterally. The imaging device 15 is constructed on a carriage 49, which is positionable with ball bearings 50 in a longitudinal guide 51. The longitudinal guide 51 is connected frame-fixed to the side walls of the sheet-fed offset printing press. A worm drive 52, which is coupled with a stepping motor, serves as a drive in a direction parallel to the rotational axis of the printing form cylinder 8.

Figure 3:
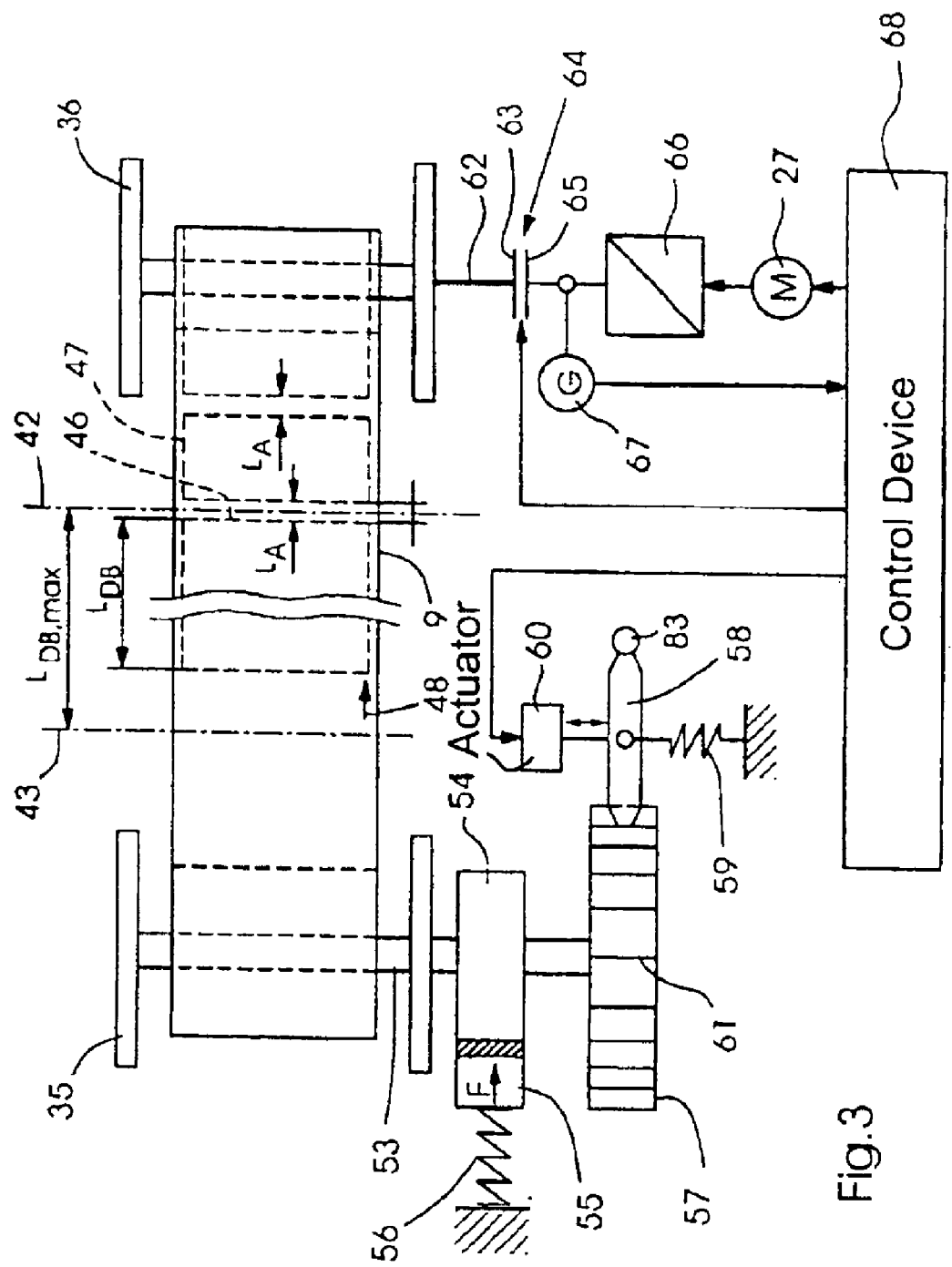
FIG. 3 is a diagrammatic and schematic view showing a device for spooling printing film forward in accordance with the method of the invention.
Figure 4:
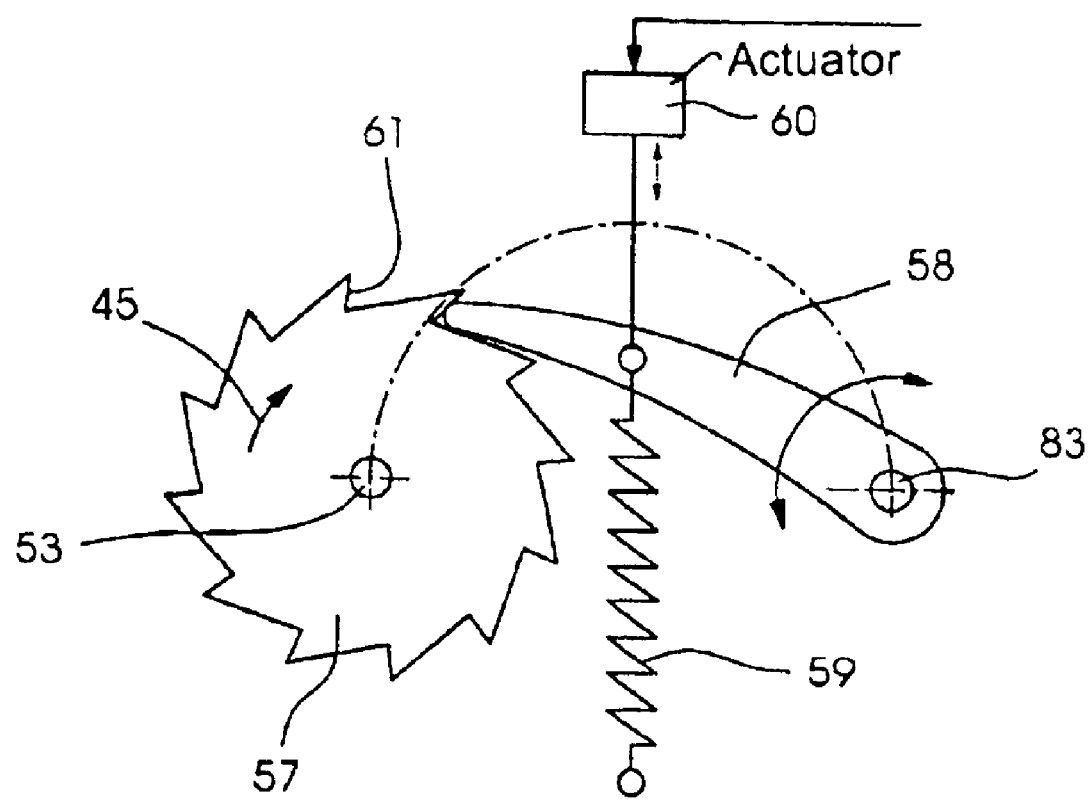
FIG. 4 is a side-elevational view of a toothed directional locking mechanism at an unwinding spool.

FIG. 3 is a more detailed view of a device, which serves for drawing the printing film or master 9 onto the printing form cylinder 8. The schematic drawing according to FIG. 3 shows the unwinding spool 35 and the rewinding spool 36 in a manner detached from the printing form cylinder 8. The printing film or master 9 extends from the unwinding spool 35 via the channel edge 43, the circumferential surface of length $L_{DBmax}$ of the printing form cylinder 8 and the channel edge 42 onto the rewinding spool 36. Located on a shaft or axle 53 of the unwinding spool 35 is a brake disk 54, which is acted upon by a pressure piece 55, which, in turn, is acted upon by a spring 56. A friction moment, which inhibits the movement of the unwinding spool 35, is produced at the brake disk 54 by the force F of the spring 56. Furthermore, a ratchet wheel 57 of a toothed directional locking mechanism (shown in greater detail in FIG. 4) is seated on the axle 53, fixed thereto against relative rotation therewith. A pawl 58 is liftable out of toothing 61 of the ratchet wheel 57, counter to the force of a spring 59, using a pneumatic actuator 60. One half 63 of a slip clutch 64, the release moment of which is adjustable, is disposed on an axle or shaft 62 of the rewinding spool 36. The second half 65 of the slip clutch 64 is coupled with a drive formed of a gear mechanism 66 and the motor 27. The rotational movement resulting at the clutch half 65, is detectable or determinable by a rotary encoder 67. The rotary encoder 67, the motor 27, the limiting force control elements of the slip clutch 64, and the actuator 60 are connected to a control device 68.

Figure 5:
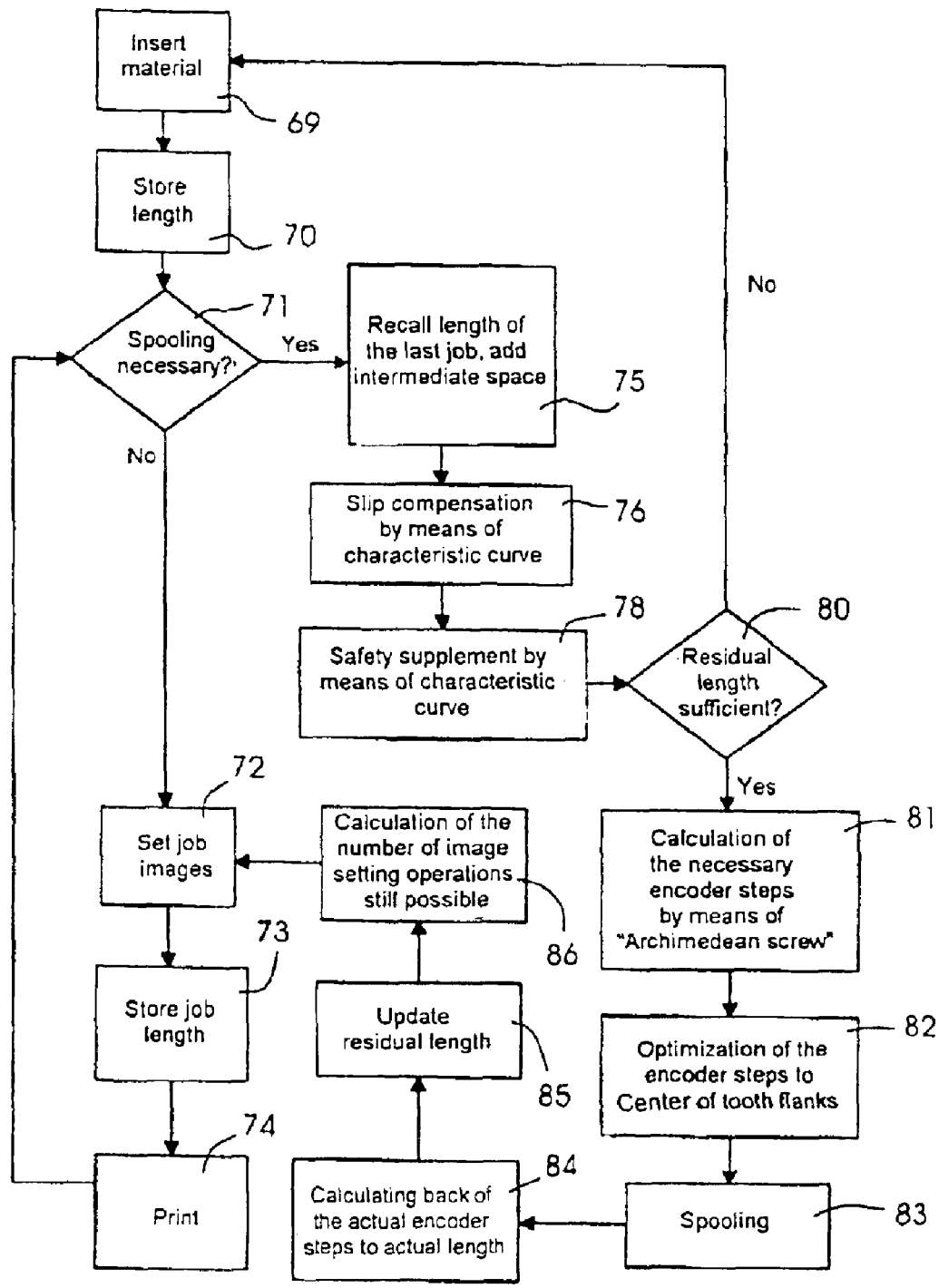
FIG. 5 is a flow chart depicting the operation of the sheet-fed offset printing press of FIG. 1.

With this device, the method for drawing printing masters or films 9 onto printing form cylinders can be carried out as follows:

In a manner corresponding to the flow chart shown in FIG. 5, an unwinding spool 35 with a supply of printing masters or film 9 is inserted into each printing form cylinder 8 in a step 69. In a further step 70, the overall length $L_G$ of the supply is stored in the control device 68. When the printing master or film 9 has been wound around the circumferential surface of the printing form cylinder 8 and connected to the rewinding spool 36, a check is made in a next step 71 as to whether forward spooling should be performed for the next print job. Forward spooling would not be necessary for the first print job or for inserting a further printing image into an existing printing image. The appropriate imaging or image-setting device 15 is set in operation in a step 72 both for the first print job and for the further image inserting operation. In a subsequent step 73, the length $L_{DB}$ of the printing image that is produced is stored.

This can take place in a buffer storage within the control device 68. In the initial state, the buffer storage can be initially set to zero. The buffer storage is rewritten whenever the length of the printing image of a print job, which is to have its images set, is greater than the value contained in the buffer storage. Assurance is thereby provided that the length of the used or spent printing master or film 9 is stored correctly in the case of image inserting operations.

Figure 6:
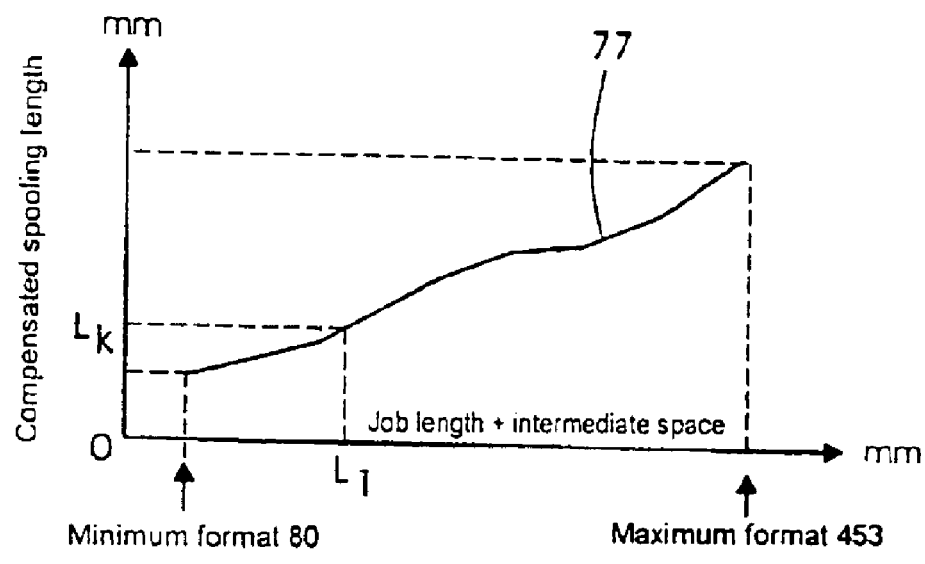
FIGS. 6 and 7 are plot diagrams of characteristic curves which serve in the calculation of a length of printing film to be spooled forward.
Figure 7:
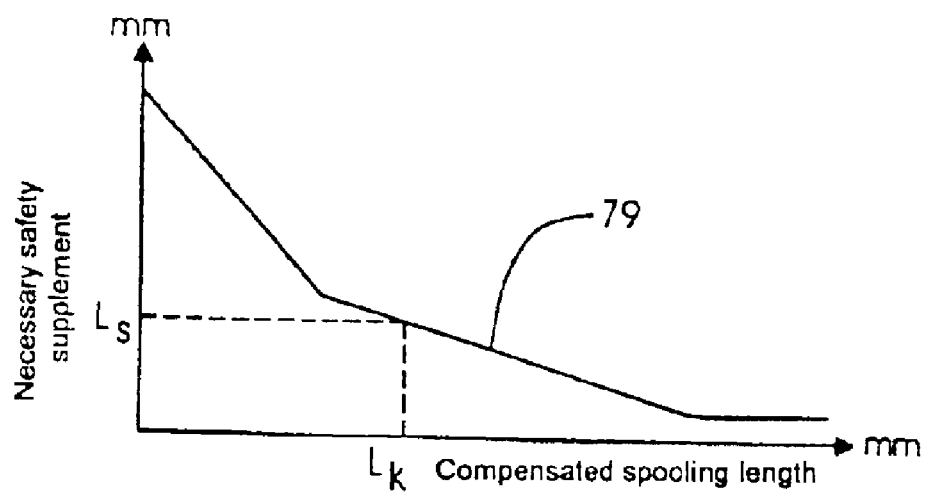

After the imaging or image setting operation and after the length $L_{DB}$ of the printing image has been stored, the print job can be processed in a step 74. If the result of the check in step 71 is that it is necessary to spool printing film 9 forward, then the length of printing film 9 to be spooled forward is calculated in a step 75 by adding a value for an intermediate space from the printing image currently to be set to the length of the imaging operation of the preceding print job. Because slip occurs with the drive wheel for the rewinding spool 36 when spooling the printing film 9 forward, the previously calculated advance length $L_1$ is corrected by applying a characteristic curve 77 in the next step 76. A characteristic curve 77 of this type is shown in FIG. 6. The characteristic curve 77 has been empirically determined and shows the allocation of provisionally calculated advance lengths $L_1$ between a minimum format and a maximum format to compensated advance lengths $L_K$. In a further step 78, a safety supplement $L_S$ is additionally added to the compensated advance length $L_K$ using a further characteristic curve 79 shown in FIG. 7. After the advance length corrected by the safety supplement $L_S$ has been obtained, a check is made in a step 80 whether the remaining residual amount of printing film 9 is sufficient to carry out the current print job. If sufficient printing film material is no longer available, the drawing-on operation is continued with step 69. If sufficient material is available, the increments of the rotary encoder 67 which are to be activated for the length of printing form material to be spooled forward are calculated in a step 81. For this purpose, it is possible to use the radius and the thickness of the printing film 9 on the unwinding spool 35. During unwinding, the printing film 9 exhibits the characteristics of an Archimedes' screw.

Figure 8:
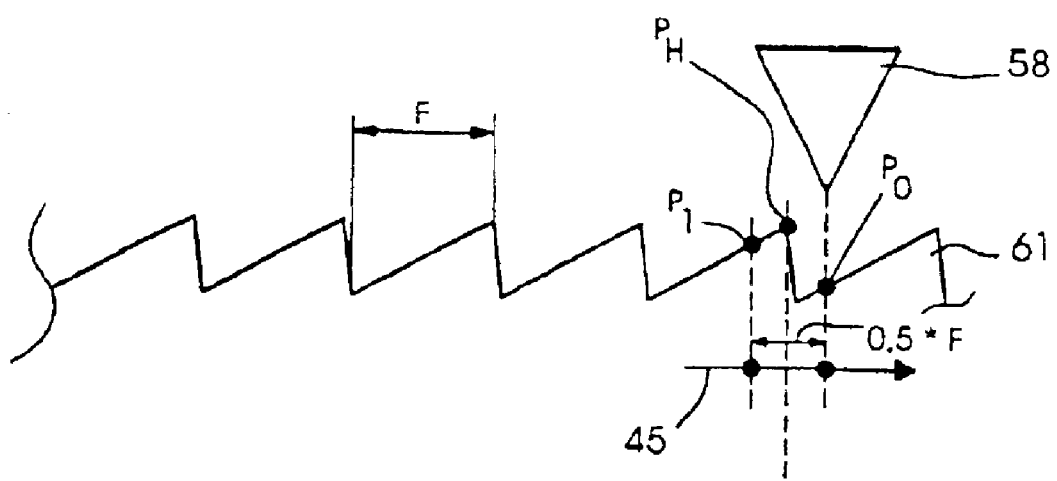
FIG. 8 is a schematic illustration used for optimizing the advance length to the tooth flank length of a ratchet wheel.

The unwinding spool 35 can be arrested by the pawl 58 and the ratchet wheel 57 only within the constraints of the tooth pitch at the ratchet wheel 57. For this reason, the rotary encoder increments are optimized to the center of the tooth flanks in a subsequent step 82. This optimization is shown diagrammatically in FIG. 8. FIG. 8 shows the unwound toothing 61 of the ratchet wheel 57. In order to advance the printing film 9, the pawl 58 is lifted out of the toothing 61 by the actuator 60. The pawl 58 is pivoted here about an axle 83. When the rotary encoder increments calculated in step 81 have been reached during the forward-spooling operation with the motor 27, the actuator 60 is deactivated by the control device 68, i.e., the pawl 58 would latch into the toothing 61 with the aid of the spring 59 at the calculated triggering point $P_1$. The optimized triggering point $P_o$ for the actuator 60 is half a tooth flank length F ahead of the calculated triggering point $P_1$. This results in an actual arresting point $P_H$ of a maximum of plus 0.5 and a minimum of minus 0.5 of a tooth flank length F. Accordingly, the absolute accuracy is one tooth flank length F, the sum of the deviations tending towards zero over a large number of imaging operations.

After the rotary encoder increments have been optimized to the center of the tooth flanks in step 82, the forward-spooling operation is carried out in a step 83 using the motor 27. The motor 27 turns the rewinding spool 36 via the gear mechanism 66 and the slip clutch 64, until the optimized number of rotary encoder increments is reached. The control circuit 68 brings about the deactivation of the actuator 60, so that the ratchet wheel 57 and, accordingly, the unwinding spool 35 are locked by the pawl 58. While the motor 27 is still rotating, the printing film 9 is tautened on the circumferential surface of the printing form cylinder 8 until the limiting moment is reached at the slip clutch 64, and the slip clutch 64 starts to slip. The motor 27 is then switched off. The tensioning or tautening of the printing film 9 is preserved because a freewheel at the axle 62 of the rewinding spool 36 prevents the latter from turning back or reversing the direction thereof.

In a next step 84, the length of the printing film 9 actually spooled forward is calculated from the actual detected increments of the rotary encoder 67. In a further step 85, the residual length of the printing film 9 is updated based upon the length actually spooled forward.

Finally, in a step 86, the number of imaging operations in the maximum format which are still possible is calculated. This number can be displayed to an operator of the sheet-fed offset printing press via the control device 68. The number is calculated from the total length $L_G$, which has already been stored in step 70, minus a safety amount ($L_{E,A}+L_{E,E}$) which is the minimum that must be present for winding up purposes on the rewinding spool and the minimum that must remain on the unwinding spool 35, and minus the residual length updated in step 85, divided by the length $L_{DBmax}$ in the maximum format plus an intermediate space $L_A$, as used in step 75.

Figure 9:
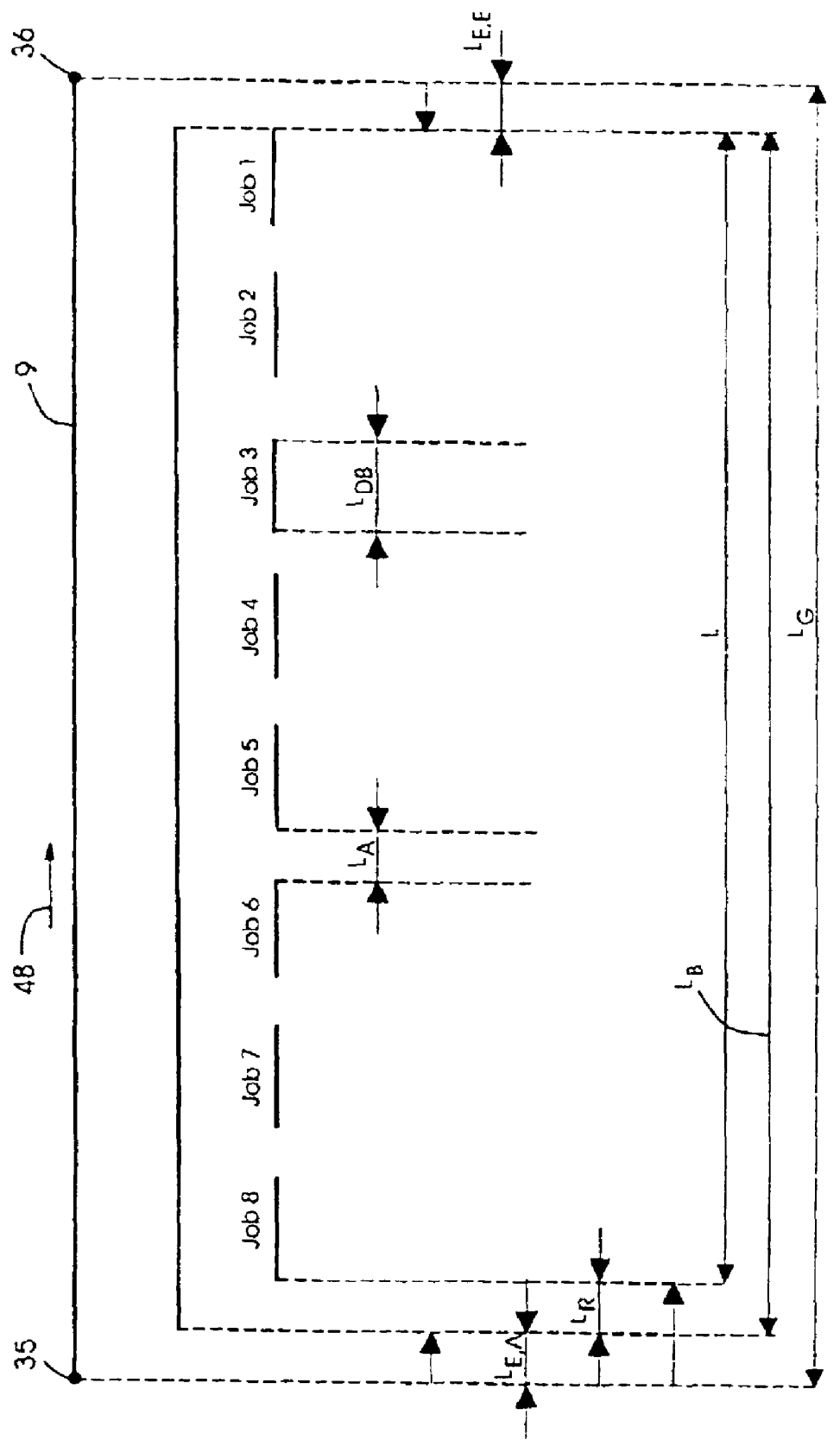
FIG. 9 is an illustration having length designations for the calculation of a length of printing film to be spooled forward.

When processing a plurality of print jobs, the result is the geometric conditions shown in FIG. 9 for the utilization of the material of the printing film 9. If, as described in step 69, an unwinding spool 35 is provided with new printing film 9, the printing film 9 has the overall length $L_G$ in the initial state. In order to insert the printing film 9 into the unwinding spool 35 and the rewinding spool 36 and to bridge the distance to the channel edges 42 and 43, a given insertion length $L_{E,A}$, $L_{E,E}$ is used at the start and at the end, from which the usable material length $L_B$ results.

The first print job is placed at the start of the usable material length $L_B$. All the print jobs have an imaging or image-setting length $L_{DB}$, there being in each case a spacing $L_A$ between the printing images in the forward-spooling direction 48. The imaging lengths $L_{DB}$ are variable, i.e., they have different magnitudes. A non-usable remainder of length $L_R$, which is zero in the most favorable case, remains between the end of the last print job and the end of the usable material length $L_B$.

Figure 10:
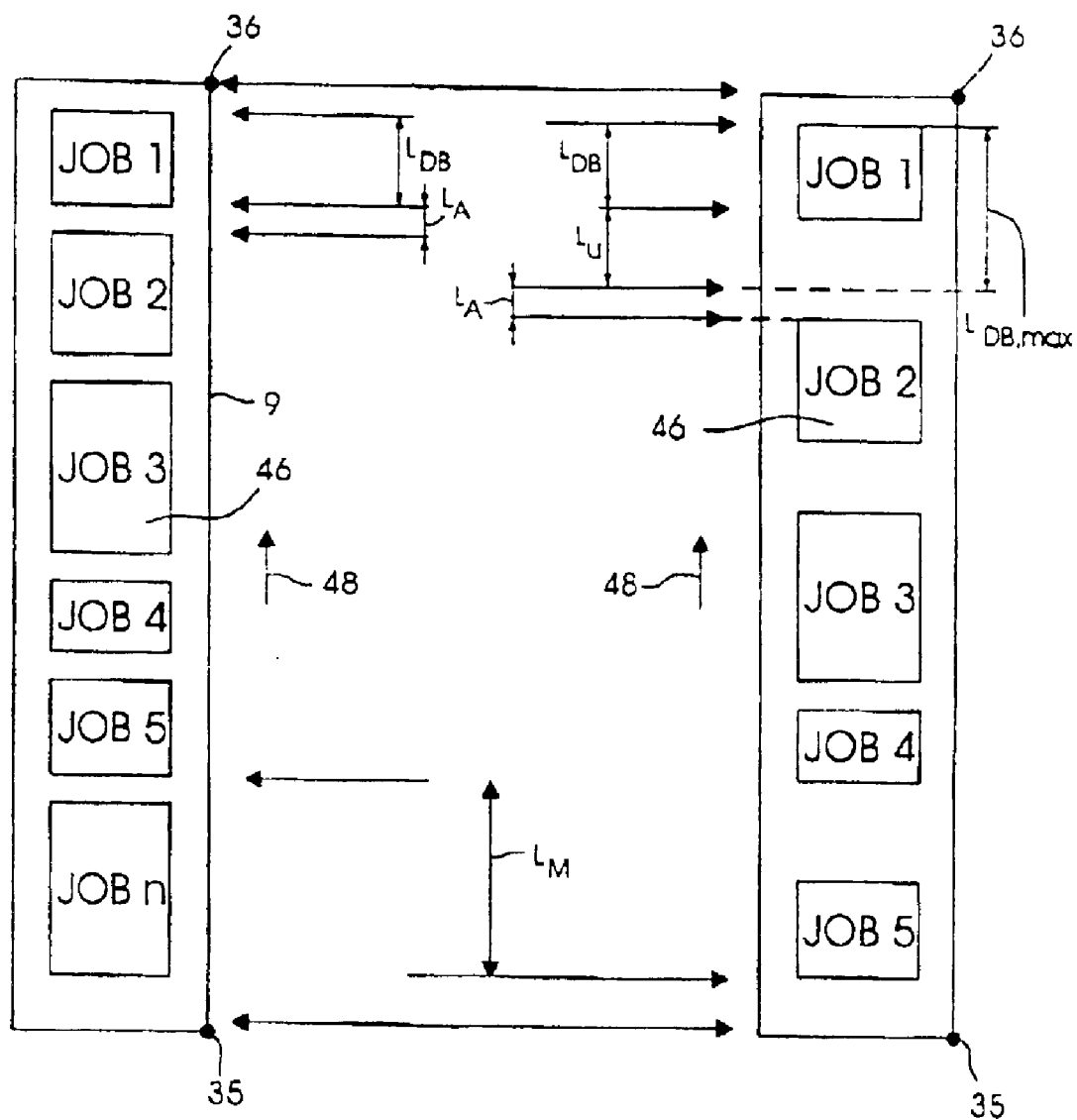
FIG. 10 is an illustration showing a comparison of distributions of print jobs on a printing master according to the state of the prior art and in accordance with the invention.

FIG. 10 illustrates how, by the method according to the invention, it is possible to utilize the length of the printing film 9 better, compared with the prior art, by optimizing the spacings $L_A$ between the printing images. The formats of five print jobs Job 1 to Job 5 and an additional print job Job n are illustrated. Furthermore, the positions of the images on the printing film 9 are shown on the lefthand and righthand sides, according to the invention and in the case of improvements in accordance with the prior art. According to the prior art, the forward-spooling operation is always carried out by a maximum printing image length $L_{DBmax}$ plus a spacing $L_A$. This results in non-utilized regions $L_U$ on the printing film 9 for print jobs with small printing image lengths. According to the invention, in contrast, in each case only as much material length is spooled forward as the imaging length $L_{DB}$ in the preceding print job, plus an intermediate space $L_A$ which is optimized with regard to slip and tolerances in the spooling device and with regard to the tooth pitch of the ratchet wheel 57. As is shown in the lefthand part of FIG. 10, an additional print job Job n fits onto the material of the printing film 9, so that better utilization of material of length $L_M$ results. This positive effect manifests itself, in particular, during the processing of a large number of print jobs with small printing image lengths $L_{DB}$.

Figure 11:
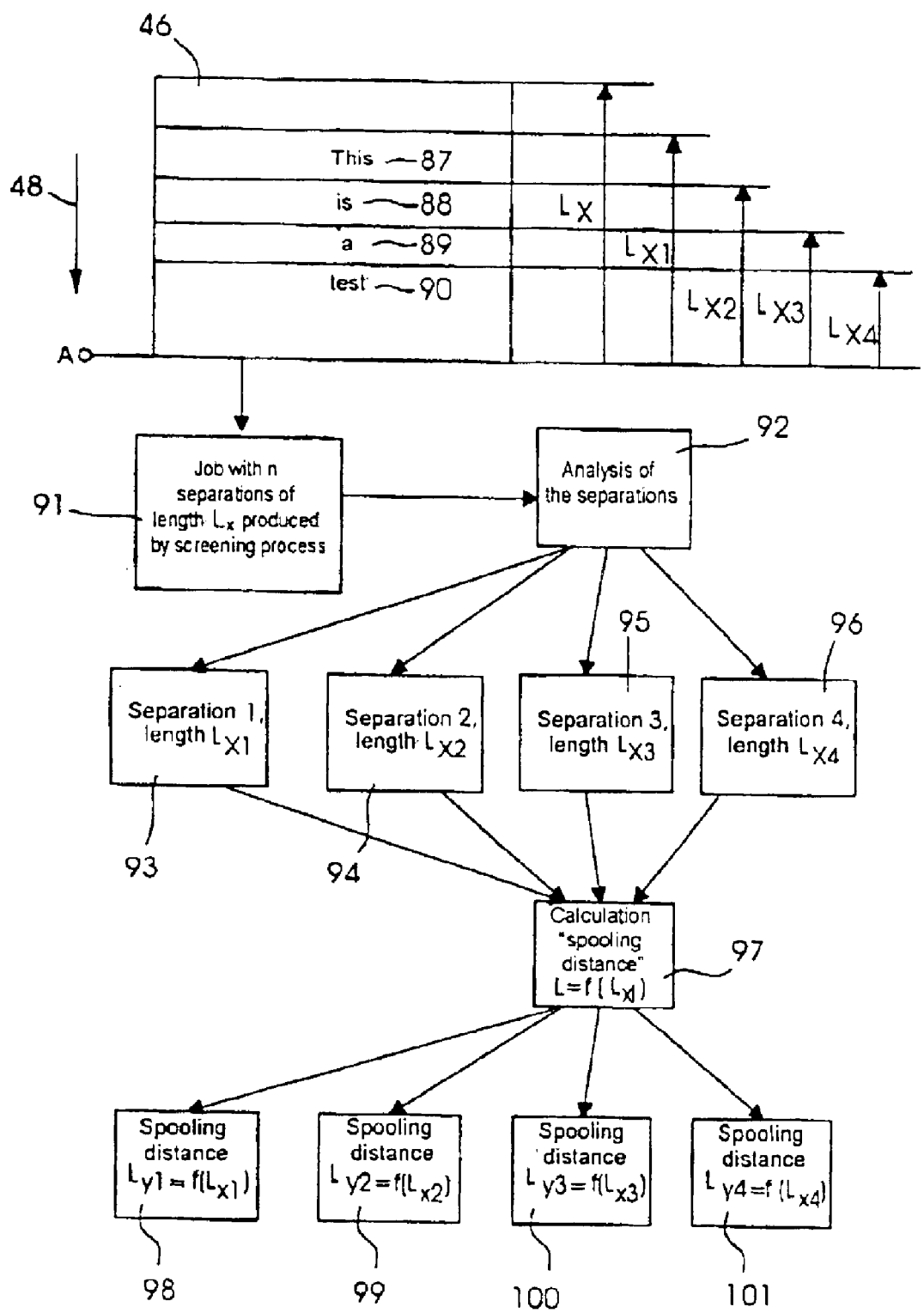
FIG. 11 is an illustration for calculating a length of printing master or film to be spooled forward, taking into account the lengths of screened or half-tone images.

Using FIG. 11, another mode of the method is described, wherein the screened image data of the separate colors are taken into consideration in the calculation of the lengths to be spooled forward. FIG. 11 shows a printing image 46, which has been produced by printing four separate colors or color separations 87 to 90 over one another. The length of the overprint is $L_X$ in the circumferential direction of a printing form cylinder 8. The lengths of the color separations 87 to 90 differ from one another. Ordered according to their length, the color separations 87 to 90 have the lengths $L_{X1}$, $L_{X2}$, $L_{X3}$, $L_{X4}$, the color separations 87 to 90, respectively, beginning at the printing start A of the printing image 46. In order to set images on the printing film 9, four color separations in the form of four screened image data sets have been produced from the printing image 46 over the entire printing image length $L_X$ in a screening process step 91. The screened image data sets are processed in an analysis program in a step 92. As the result of this processing, the lengths $L_{X1}$ to $L_{X4}$ of the four color separations are output in steps 93 to 96. In a step 97, the length values $L_{X1}$ to $L_{X4}$ are processed to give values for the lengths $L_{Y1}$ to $L_{Y4}$ of the printing film 9 and issued in steps 98 to 101. The values for the lengths $L_{Y1}$ to $L_{Y2}$ to be spooled forward are processed to give manipulated variables for the motors 27 acting upon the rewinding spools 36. According to this variation in the method invention, the spooling distance of the printing film 9 is different for all the color separations 87 to 90, as a result of which there is a further saving of printing film 9. The saving is all the greater, when the printing image length of a color separation starting from the print start A is shorter.

The method invention is not restricted to the exemplary mode described herein. It is likewise possible to apply the invention to printing presses of in-line construction. The invention can be used both for printing on sheets and on webs in accordance with the offset, gravure or flexographic techniques, insofar as printing forms or masters are produced on printing films 9.

We claim:

1. A method for mounting a printing master in the form of a foil or film on a printing form cylinder, which comprises:

making ready a new print job with a given printing-image length by releasing an unwinding spool;

activating a drive for the unwinding spool for moving the printing master a prescribed length in circumferential direction of the printing form cylinder on a circumferential surface of the printing form cylinder by drawing the printing master to a rewinding spool;

braking the unwinding spool to build up tension in the printing master;

locating an image start of a preceding print job on the circumferential surface of the printing form cylinder facing the rewinding spool;

providing a control device for activating the drive for the unwinding spool;

producing data in the control device regarding the length to be spooled forward, before activating the drive for the unwinding spool;

fixing the rewinding spool and the unwinding spool, after advancing the printing master the prescribed length, for insuring tension in the printing master;

determining a value of the length of the printing master to be spooled forward, being at most equal to a length of a printing image of the immediately preceding print job plus a printing image spacing; and calculating in a preceding print job, wherein partial images are present in the form of digital data, the length of the printing master to be spooled forward, by determining, for a partial image, the spacing of a screening pixel lying farthest away from the image start in the circumferential direction of the printing form cylinder.

2. The method according to claim 1, which further comprises determining the printing image spacing by applying at least one of the following variables:

a correction value for mechanical slip and for tolerances in the drive of the rewinding spool;

a residual material length of the printing master;

a safety spacing; and a correction value for the spacing of teeth of a toothed directional locking mechanism connected to the unwinding spool for fixing the unwinding spool after the printing master has been advanced.

3. The method according to claim 2, which further comprises basing the safety spacing on empirically determined statistical values.

4. The method according to claim 2, which further comprises determining remaining possible print jobs from the residual material length.

5. The method according to claim 1, which further comprises determining the spacing during imaging of the printing master for the preceding print job by counting and buffer-storing, column by column, cycles required in the circumferential direction when producing screening pixels on the printing master, and determining a maximum value of the cycle numbers, buffer-stored column by column, across all of the columns of color separation, and applying that maximum value when calculating the length to be spooled forward.

6. The method according to claim 1, which further comprises determining the spacing by simulating imaging of the printing master for the preceding print job.

* * * * *